(12) United States Patent
Larsson et al.

(10) Patent No.: US 8,733,801 B2
(45) Date of Patent: *May 27, 2014

(54) SWIVEL JOINT

(75) Inventors: Thomaś Larsson, Kungsör (SE); Håkan Persson, Västerfärnebo (SE); Peter Hauki, Virsbo (SE)

(73) Assignee: Uponor Innovation AB, Virsbo (SE)

( * ) Notice: Subject to any disclaimer, the term of this patent is extended or adjusted under 35 U.S.C. 154(b) by 0 days.

This patent is subject to a terminal disclaimer.

(21) Appl. No.: 12/692,725

(22) Filed: Jan. 25, 2010

(65) Prior Publication Data

US 2010/0194101 A1 Aug. 5, 2010

(30) Foreign Application Priority Data

Jan. 30, 2009 (EP) ..................... 09151732

(51) Int. Cl.
*F16L 25/00* (2006.01)
(52) U.S. Cl.
USPC .......................................... 285/386; 285/354
(58) Field of Classification Search
USPC .................. 285/247, 386, 387, 921, 288, 354
See application file for complete search history.

(56) References Cited

U.S. PATENT DOCUMENTS

| | | | | |
|---|---|---|---|---|
| 773,965 | A * | 11/1904 | McIntyre et al. | 285/247 |
| 2,417,350 | A * | 3/1947 | Conroy | 29/443 |
| 2,525,616 | A * | 10/1950 | Peeps | 285/247 |
| 2,753,215 | A * | 7/1956 | Barr | 239/447 |
| 3,672,704 | A | 6/1972 | Christianson | |
| 3,723,946 | A * | 3/1973 | Weatherup et al. | 439/320 |
| 3,893,719 | A * | 7/1975 | Eidelberg et al. | 285/151.1 |
| 3,951,438 | A * | 4/1976 | Scales | 285/55 |
| 4,262,941 | A | 4/1981 | Lalikos et al. | |
| 4,616,856 | A * | 10/1986 | Kowalyshen | 285/92 |
| 4,664,427 | A * | 5/1987 | Johnston | 285/340 |
| 4,893,848 | A * | 1/1990 | Melcher | 285/258 |
| 5,280,966 | A * | 1/1994 | Morris et al. | 285/89 |
| 5,390,965 | A * | 2/1995 | Few | 285/116 |
| 5,476,291 | A * | 12/1995 | Reneau | 285/258 |
| 6,447,017 | B1 * | 9/2002 | Gilbreath et al. | 285/89 |
| 6,851,448 | B2 * | 2/2005 | Fujii | 137/515 |
| 7,014,215 | B2 * | 3/2006 | Cooper et al. | 285/247 |
| 7,284,774 | B2 * | 10/2007 | Bauer et al. | 285/319 |

(Continued)

FOREIGN PATENT DOCUMENTS

| | | | | |
|---|---|---|---|---|
| DE | 3220687 A1 * | 12/1983 | | F16L 37/12 |
| DE | 3507530 A1 * | 9/1986 | | F16L 37/14 |

(Continued)

*Primary Examiner* — Aaron Dunwoody
(74) *Attorney, Agent, or Firm* — Occhiuti & Rohlicek LLP

(57) ABSTRACT

A swivel joint includes a pipe part and a swivel nut. The pipe part has a first end and a second end and the swivel nut has a first end and a second end. The swivel nut is positioned on the pipe part such that the first end of the swivel nut forms a swivel connection with the first end of the pipe part. The swivel nut and the pipe part include shoulders against each other for preventing separation of the swivel nut from the pipe part. The swivel nut is made such that the swivel nut and the pipe part are connected together by pushing the first end of the swivel nut towards the first end of the pipe part whereby the swivel nut and the pipe part are connected by a snap joint.

16 Claims, 2 Drawing Sheets

(56) References Cited

U.S. PATENT DOCUMENTS 7,347,729 B2 * 3/2008 Thomas et al. ............... 439/583
7,661,722 B2 * 2/2010 Tarquini et al. ............... 285/249
7,784,836 B2 * 8/2010 Dworatzek et al. ........... 285/272

FOREIGN PATENT DOCUMENTS

| | | | | |
|---|---|---|---|---|
| DE | 10207556 | 9/2003 | | |
| EP | 0775501 | 5/1997 | | |
| EP | 1096193 | 5/2001 | | |
| EP | 1760382 | 3/2007 | | |
| EP | 2060840 | 5/2009 | | |
| FR | 2700196 A1 * | 7/1994 | ............. | F16L 37/08 |
| GB | 1361768 | 7/1974 | | |
| WO | WO 8303130 A1 * | 9/1983 | ............. | F16L 37/12 |
| WO | 2005/080852 | 9/2005 | | |

* cited by examiner

SWIVEL JOINT

CROSS-REFERENCE TO RELATED APPLICATIONS

This application claims priority to European application no. 09151732.6, filed on Jan. 30, 2009. The contents of the application is hereby incorporated by reference in its entirety.

BACKGROUND OF THE INVENTION

The invention relates to a swivel joint comprising a pipe part having a first end and a second end, and a swivel nut having a first end and a second end, whereby the swivel nut is positioned on the pipe part such that the first end of the swivel nut forms a swivel connection with the first end of the pipe part, the swivel nut and the pipe part comprising each at least one shoulder against each other for preventing separation of the swivel nut from the pipe part.

Document WO 2005/080852 discloses a pipe coupling system. The pipe coupling system comprises a pipe provided with a flange. A swivel nut is fitted onto the pipe. A stopper is formed at the rear end of the swivel nut and the stopper is locked to the flange of the pipe to prevent separation thereof. The flange is formed by bending the end of the pipe in a direction perpendicular to a circumferential surface thereof. It is quite difficult to manufacture the parts of the coupling, and thus the coupling is quite expensive. Making the pipe coupling also requires many manufacturing steps.

Document EP 1 760 382 discloses a pipe connection. The pipe connection comprises a pipe stub and a swivel nut. The pipe stub comprises a locking groove for engagement of a locking ring. The locking ring locks the pipe stub and the swivel nut together. The use of the locking ring requires that the parts of the pipe connection are quite complex and the pipe connection also comprises many parts, whereby manufacturing the parts of the pipe connection is quite difficult and expensive and it is quite difficult to make the pipe connection reliable or secure.

BRIEF DESCRIPTION OF THE INVENTION

The invention is characterized in that the swivel nut is made such that the swivel nut and the pipe part are connected together by pushing the first end of the swivel nut towards the first end of the pipe part, whereby the swivel nut and the pipe part are connected by a snap joint.

The idea of the invention is that the swivel joint comprises a pipe part and a swivel nut. The swivel nut is positioned on the pipe part such that the first end of the swivel nut forms a swivel connection with the first end of the pipe part. The swivel nut and the pipe part comprise shoulders against each other for preventing separation of the swivel nut from the pipe part. The swivel nut is made such that the swivel nut and the pipe part can be connected together by pushing the first end of the swivel nut towards the first end of the pipe part, whereby the swivel nut and the pipe part are connected by a snap joint. The swivel nut can be made, for example, by injection moulding. The swivel nut can also be made by machining. It is relatively simple and easy to produce a great number of parts of the swivel joint and the parts are easily assembled together. The swivel joint is very simple and does not comprise many parts. It is also easy to make the swivel joint tight such that leakages do not occur.

According to an embodiment, the swivel nut comprises at its first end a chamfer surface which lies against the first end of the pipe part when the swivel nut is pushed on the pipe part, and a shoulder surface which lies against a corresponding shoulder surface of the first end of the pipe part when the swivel joint is in use, and the angle between the chamfer surface and the axial direction of the swivel joint is smaller than the angle of the shoulder surface and the axial direction of the swivel joint. Thereby the force required to separate the swivel nut and the pipe part is greater than the force required for pushing the swivel nut on the pipe part. Thus, it is relatively easy to combine the swivel nut and the pipe part and after making the snap joint, a greater force is required for separating the parts. Thus, forming of the swivel joint is easy and the swivel joint is reliable in use.

According to another embodiment, the first end of the swivel nut comprises an annular enlargement for strengthening the first end of the swivel nut. This makes the swivel joint reliable in use. As used herein, the term "annular" is defined as "having the form of a ring", and the "ring" is defined as "a circular line, figure or object."

According to a third embodiment, the swivel nut comprises a neck, the outer surface of which has a shape of a tapering cone tapering inwards towards the first end of the swivel nut. This shape also increases the strength of the swivel joint.

According to a fourth embodiment, the swivel joint comprises a gasket at the first end of the pipe part.

BRIEF DESCRIPTION OF THE FIGURES

The invention will be described in detail with reference to the accompanying drawing, wherein FIG. 1 schematically shows a side view of a swivel joint in cross section, FIG. 2 schematically shows a side view of a detail of a swivel nut in cross section, and FIG. 3 schematically shows a side view of a swivel nut and a nipple in cross section.

DETAILED DESCRIPTION OF THE INVENTION

Figure 1:
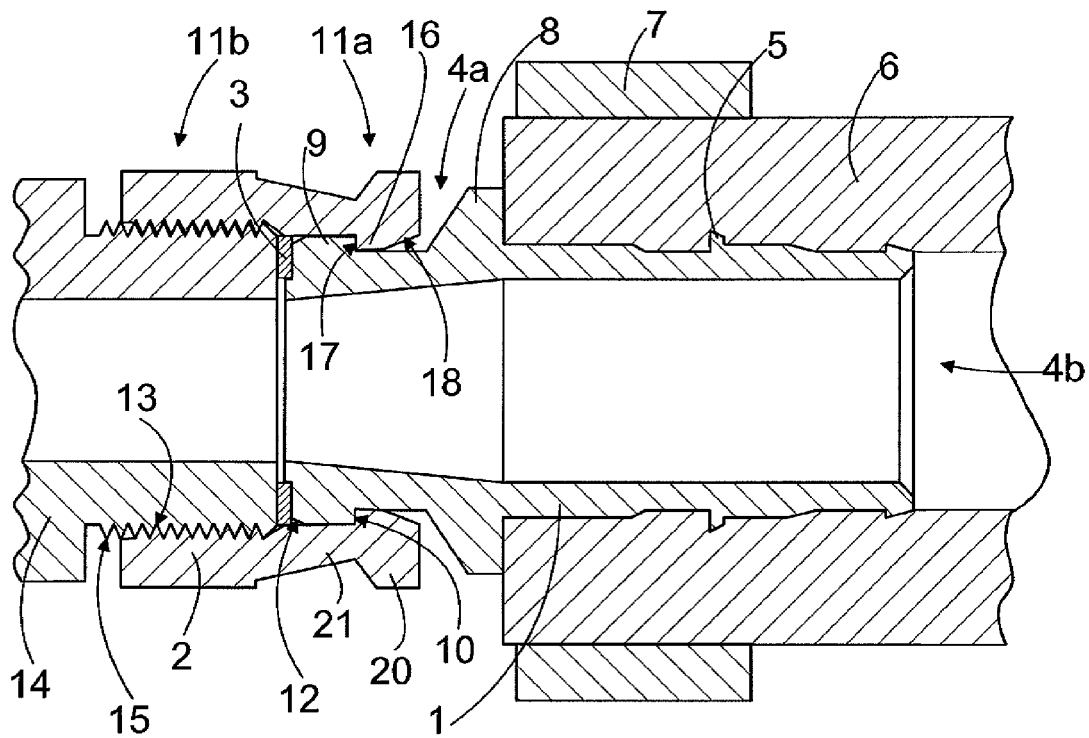

FIG. 1 shows a swivel joint comprising a pipe part in the form of a nipple 1, a swivel nut 2 and a gasket 3. The gasket 3, however, is optional. Thus there can be a gasket 3 but it is not required for the basic structure. Thus, in this embodiment, the swivel joint only comprises two or three parts, whereby the swivel joint is simple and therefore easy to manufacture and reliable.

The nipple 1 comprises a first end 4a and a second end 4b. The swivel nut 2 is connected to the first end 4a of the nipple 1. The second end 4b of the nipple 1 comprises annular grip protrusions 5 and/or corresponding grooves, whereby the second end 4b is intended to be connected to an end of a pipe 6. The pipe 6 can be made of cross-linked polyethylene PEX, for example.

A clamping ring 7 is positioned around the end of the pipe 6 for securing a tight and firm connection between the pipe 6 and the nipple 1. The nipple 1 is also provided with stop protrusions 8. The stop protrusions 8 define the correct position of the pipe 6 on the second end 4b of the nipple. In the embodiment shown in FIG. 1, the nipple 1 comprises two stop protrusions 8. The nipple 1 may also comprise three or more stop protrusions 8. Also only one stop protrusion 8 could be sufficient in certain cases. If only one stop protrusion is used, the stop protrusion 8 can then be annular.

The first end 4a of the nipple 1 comprises an outwards protruding annular locking protrusion 9. The locking protrusion 9 has a locking shoulder 10.

The swivel nut 2 comprises a first end 11a and a second end 11b. The first end 11a of the swivel nut 2 forms a swivel connection with the first end 4a of the nipple 1.

The second end 11b comprises a female thread 13. The female thread 13 facilitates the connection of the swivel nut to a piping part 14 having an outer male thread 15. The piping part 14 can be a fitting or a branch of a manifold or a water tap or any suitable male threaded fitting or plumbing fixture, for example.

The first end 11a of the swivel nut 2 comprises an inwards protruding annular locking protrusion 16. The locking protrusion 16 forms a locking shoulder 17. When the swivel joint is in use, the locking shoulder 17 of the swivel nut lies against the locking shoulder 10 of the nipple 1.

The swivel nut 2 is made of a plastic material, for example, such that the swivel nut 2 and the nipple 1 can be connected together by pushing the first end 11a of the swivel nut 2 towards the first end 4a of the nipple 1, whereby the swivel nut 2 and the nipple 1 are connected by a snap joint. Thus, the swivel nut 2 is somewhat elastic such that the first end 11a of the swivel nut 2 yields such that the inwards protruding locking protrusion 16 can be pushed past the outwards protruding locking protrusion 9. After yielding the swivel nut 2 returns to its original shape or close to its original shape. Because the swivel nut 2 is connected with the nipple 1 by pushing the first end 11a of the swivel nut 2 towards the first end 4a of the nipple 1, the stop protrusion 8 and/or any other protrusion at the second end 4b of the nipple can be made so high that they effectively prevent the swivel nut 2 from slipping off the nipple through the second end 4b of the nipple.

The material of the swivel nut 2 is preferably polyphenylene sulfone PPSU. The swivel nut 2 can also be made of polyoxymethylene POM, polyamide PA, a blend of polyphenylene sulfone PPSU and polysulfone PSU, engineering plastic or any other suitable plastic material or plastic composite, for example. The swivel nut 2 can also be made of any suitable composite material. The structure of the swivel nut 2 can also comprise two or more layers, whereby the material of a layer can be plastic, composite material and/or metal.

The nipple 1 can also be made of plastics, such as polyphenylene sulfone PPSU, polysulfone PSU or polyamide PA. The nipple 1 can also be made of metal, such as steel or brass, for example. The steel can be stainless steel, for example, and the brass can be normal or dezincification resistant brass, for example.

The swivel nut 2 and the nipple 1 can be made by injection moulding, for example. The swivel nut 2 and a straight nipple 1 can also be machined. A nipple 1 can also be forged, for example.

Figure 2:
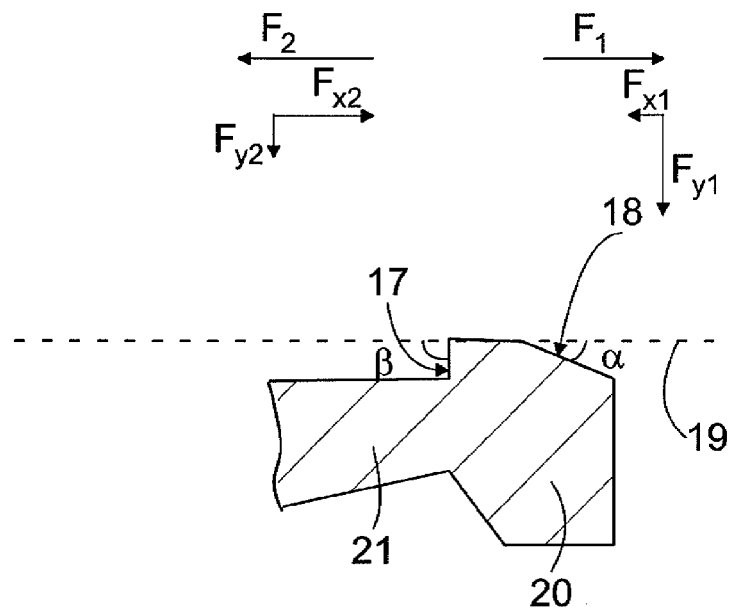

The first end 11a of the swivel nut 2 is shown in greater detail in FIG. 2. The first end 11a of the swivel nut 2 is provided with a chamfer surface 18 for facilitating the pushing of the swivel nut 2 on the first end 4a of the nipple 1. The chamfer surface 18 lies against the first end 4a of the nipple when the swivel nut 2 is pushed on the nipple 1. The nipple 1 can also have a chamfer surface 12 at its first end 4a. The chamfer surface 18 forms an angle α to the axial direction 19 of the swivel joint. The shoulder 17 forms an angle β to the axial direction 19 of the swivel joint. When the swivel nut 2 is pushed towards the nipple, a force $F_1$ in the axial direction of the swivel joint acts on the swivel nut. Simultaneously a counter force having an axial component $F_{x1}$ and a component in the radial direction $F_{y1}$ acts on the swivel nut. Because of the chamfer surface 18, the radial component $F_{y1}$ is quite high and therefore the first end 11a deforms such that its diameter flares out. The diameter flares out during assembly only and thereafter returns back at least to some extent. When the swivel joint is in use such that the swivel nut is threaded into connection with the piping part, a force $F_2$ acts on the swivel nut 2. Simultaneously, a counter force having an axial component $F_{x2}$ and a radial component $F_{y2}$ acts on the swivel nut 2. Because the angle β between the shoulder 17 surface and the axial direction 19 of the swivel joint is relatively big, the radial component $F_{y2}$ is so small that it does not cause deformation of the first end 11a of the swivel nut 2. The angle α can be 0-30°, for example, and the angle β can be 60-120°, for example.

The first end 11a of the swivel nut 2 further comprises an annular enlargement 20. Further, the first end 11a of the swivel nut 2 comprises a neck 21, the outer surface of which has a shape of a tapering cone, tapering inwards towards the first end of the swivel nut. The enlargement 20 and the conical neck 21 strengthen the swivel nut 2 such that a reasonably great force is required for separating the swivel nut 2 and the nipple 1. The structure and design of the swivel nut 2 ensure that the swivel nut 2 resists to an axial force for a long time.

The swivel joint can further comprise the gasket 3. The annular gasket 3 seals the gap between the nipple 1 and the piping part 14. When the swivel joint is in use, an axial force acts on the swivel joint. This axial force is compensated for by the gasket 3. The gasket 3 is made from an elastic material, such as EPDM rubber, whereby the axial force deforms the gasket 3.

Figure 3:
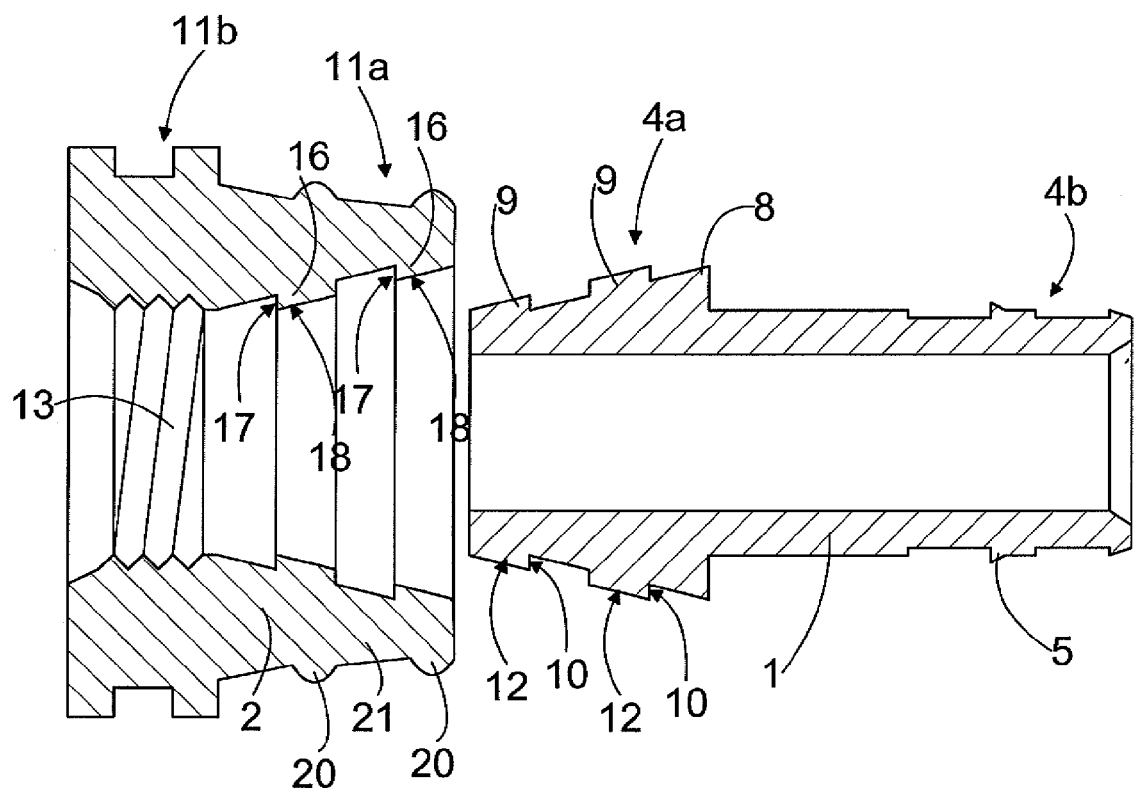

FIG. 3 shows the swivel nut 2 and the nipple 1 before the first end 11a of the swivel nut 2 is snapped on the first end 4a of the nipple 1. In this embodiment, the first end 4a of the nipple 1 comprises two annular outwards protruding locking protrusions 9 and correspondingly two locking shoulders 10. Correspondingly, the first end 11a of the swivel nut 2 comprises two inwards protruding annular locking protrusions 16 and thus two locking shoulders 17. It is also possible to provide the nipple and the swivel nut with three or more locking protrusions and locking shoulders.

As is shown in FIG. 3, the outer diameters of the successive locking protrusions 9 are different and correspondingly the inner diameters of the successive locking protrusions 16 are different which means that the two successive snap joints are formed simultaneously. The diameters of the successive locking protrusions 9 and 16 can also be equal which means that in such a case the snap joints are formed one after the other. In such a case, first a snap joint between one locking protrusion 9 and one locking protrusion 16 is formed and thereafter two successive snap joints between two successive locking shoulders 9 and two successive locking shoulders 16 are formed simultaneously.

The first end 11a of the swivel nut 2 further comprises two annular enlargements 20. The first end 11a of the swivel nut can also comprise three or more annular enlargements 20.

In the embodiment shown in FIGS. 1 and 2, the chamfer surfaces 18 and 12 have a length that is shorter than the protrusions 9 and 16. In the embodiment shown in FIG. 3, however, the protrusions 9 and 16 have chamfer surfaces 12 and 18 having a length that is equal to the length of the protrusions 9 and 16.

The swivel joint can be used in potable water piping systems, in heating systems and/or in any other systems where liquid, fluid, air or gas is transported in industrial or medical applications, for example, but shall not be limited to cover the listed systems and/or applications only.

For a person skilled in the art, it is obvious that in the course of a technical progress, the basic idea of the invention can be carried out in numerous ways. Thus, the invention and its embodiments are not limited by the above examples but they may vary within the scope of the appended claims.

The shape of the outer surface of the neck 21 can also be flat or curved. The outer surface of the neck 21 can also have a shape of a tapering cone tapering outwards.

The invention claimed is:

1. A swivel joint comprising
   a pipe part having a first end and a second end,
   the first end of the pipe part including a radially outwardly protruding locking protrusion including a first locking shoulder, and
   a swivel nut having a first end and a second end,
   the first end of the swivel nut including a radially inwardly protruding locking protrusion including a second locking shoulder, and
   the second end of the swivel nut including a threaded interior surface for connecting the swivel nut to a piping part including a threaded exterior surface by a threaded connection, the radially outwardly protruding locking protrusion of the pipe part configured to be received within the swivel nut such that a swivel connection is formed between the first end of the pipe part and the first end of the swivel nut and the first locking shoulder is configured to interact with the second locking shoulder to prevent separation of the pipe part and the swivel nut;
   wherein the swivel joint comprises a gasket separating the first end of the pipe part from a first end of the piping part.

2. A swivel joint according to claim 1, wherein the first end of the swivel nut comprises at least one chamfer surface which lies against a protrusion of the pipe part when the swivel nut is pushed on the pipe part, and at least one shoulder surface which lies against a corresponding shoulder surface at the pipe part when the swivel joint is in use.

3. A swivel joint according to claim 2, wherein
   the angle ($\alpha$) between the chamfer surface and the axial direction of the swivel joint is smaller than the angle ($\beta$) between the shoulder surface of the swivel nut and the axial direction of the swivel joint.

4. A swivel joint according to claim 2, wherein the swivel nut comprises a neck, the outer surface of which has a shape of a tapering cone, tapering inwards towards the first end of the swivel nut.

5. A swivel joint according to claim 2, wherein the swivel nut is made of a plastic material.

6. A swivel joint according to claim 2, wherein the pipe part is a nipple.

7. A swivel joint according to claim 2 wherein the swivel nut comprises at least one radially outwardly-protruding annular enlargement at the first end of the swivel nut.

8. A swivel joint according to claim 6, wherein the second end of the nipple is arranged to be connected to an end of a pipe.

9. A swivel joint according to claim 1, wherein
   the swivel nut comprises a neck, the outer surface of which has a shape of a tapering cone, tapering inwards towards the first end of the swivel nut.

10. A swivel joint according to claim 1, wherein the swivel nut is made of a plastic material.

11. A swivel joint according to claim 1, wherein
    the swivel nut comprises at its second end a thread for connecting the swivel nut to a piping part by a threaded connection.

12. A swivel joint according to claim 1, wherein the pipe part is a nipple.

13. A swivel joint according to claim 12, wherein the second end of the nipple is arranged to be connected to an end of a pipe.

14. A swivel joint according to claim 12, wherein the swivel nut comprises a neck, the outer surface of which has a shape of a tapering cone, tapering inwards towards the first end of the swivel nut.

15. The swivel joint of claim 1 wherein the swivel nut and the pipe part are connected together by pushing the first end of the swivel nut towards the first end of the pipe part such that the swivel nut and the pipe part are connected by a snap joint.

16. The swivel joint of claim 1 wherein the radially outwardly protruding locking protrusion of the pipe part is annular and the radially inwardly protruding locking protrusion of the swivel nut is annular.

* * * * *